(12) United States Patent
Lawrence et al.

(10) Patent No.: US 11,255,314 B2
(45) Date of Patent: Feb. 22, 2022

(54) ENERGY AUDIT TOOL FOR A WIND TURBINE POWER SYSTEM

(71) Applicant: General Electric Company, Schenectady, NY (US)

(72) Inventors: Joseph Chacon Lawrence, Greenville, SC (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 327 days.

(21) Appl. No.: 16/126,408

(22) Filed: Sep. 10, 2018

(65) Prior Publication Data
US 2020/0080544 A1    Mar. 12, 2020

(51) Int. Cl.
*F03D 17/00* (2016.01)
*F03D 7/04* (2006.01)

(52) U.S. Cl.
CPC .............. *F03D 17/00* (2016.05); *F03D 7/045* (2013.01); *F05B 2260/84* (2013.01); *F05B 2270/335* (2013.01); *Y02E 10/72* (2013.01)

(58) Field of Classification Search
CPC ...... F03D 17/00; F03D 7/045; F05B 2260/84; F05B 2270/335; Y02E 10/72
USPC ......................................................... 703/18
See application file for complete search history.

(56) References Cited

U.S. PATENT DOCUMENTS

| | | | |
|---|---|---|---|
| 8,604,633 | B2 | 12/2013 | Llombart Estopinan et al. |
| 2017/0074244 | A1* | 3/2017 | Huang ..................... H02J 3/50 |
| 2017/0096986 | A1* | 4/2017 | Takeuchi ................ F03D 17/00 |
| 2017/0352010 | A1* | 12/2017 | Son ......................... G06Q 10/20 |
| 2018/0274520 | A1* | 9/2018 | Wang ....................... G01P 5/26 |
| 2019/0072082 | A1* | 3/2019 | Lysgaard .............. F03D 7/0204 |
| 2019/0195189 | A1* | 6/2019 | Echenique Subiabre .................... F03D 7/00 |

FOREIGN PATENT DOCUMENTS

| | | |
|---|---|---|
| CN | 106 194 603 A | 12/2016 |
| CN | 106194603 A | * 12/2016 |
| DK | 2018 00230 A1 | 6/2018 |
| EP | 2 482 053 A1 | 8/2012 |

(Continued)

OTHER PUBLICATIONS

Wei, Mu, and Zhe Chen. "Study of LANs access technologies in wind power system." IEEE PES General Meeting. IEEE, 2010. pp. 1-6. (Year: 2010).*

(Continued)

*Primary Examiner* — Kamini S Shah
*Assistant Examiner* — John E Johansen
(74) *Attorney, Agent, or Firm* — Dority & Manning, P.A.

(57) ABSTRACT

An energy audit tool for a wind turbine power system includes a data collector module configured for temporary connection to an existing turbine controller of the existing wind turbine power system. The data collector module is configured to collect operating data of the existing wind turbine power system. The energy audit tool also includes a model simulator module configured for analyzing the collected operating data, generating a model of the existing wind turbine power system based on the collected operating data, and determining an energy loss of the existing wind turbine power system from the model of the existing wind turbine power system.

20 Claims, 6 Drawing Sheets

(56) References Cited

FOREIGN PATENT DOCUMENTS

JP            3721700 B2 *  11/2005
WO    WO-2016008500 A1 *   1/2016   ........... F03D 7/0204

OTHER PUBLICATIONS

International Search Report, dated Dec. 4, 2019.
Bak et al., Airfoil Characteristics for Wind Turbines, RISO National Laboratory, Roskilde, RISO-R-1065(EN), Mar. 1999, 53 pages.

* cited by examiner

ENERGY AUDIT TOOL FOR A WIND TURBINE POWER SYSTEM

FIELD

The present disclosure relates generally to wind turbines and, more particularly, to an energy audit tool for a wind turbine power system.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Operation of conventional wind turbines may result in unknown or hidden energy losses. Further, conventional wind turbines fail to acquire details relating to such losses. Example energy loss areas of the wind turbine may include incorrect transformer tap location, non-optimized torque table, non-optimized pitch table, excessive yawing, excessive cooling, excessive heating, common faults that are often reset without further investigation regarding cause, type, etc., and/or poorly mounted sensors.

Thus, a system and method that addresses the aforementioned issues would be advantageous. Accordingly, the present disclosure is directed to an energy audit tool for a wind turbine power system that is capable of monitoring certain inputs/outputs (I/O) of the power system to ascertain energy loss.

BRIEF DESCRIPTION

Aspects and advantages of the invention will be set forth in part in the following description, or may be obvious from the description, or may be learned through practice of the invention.

In one aspect, the present disclosure is directed to an energy audit tool for a wind turbine power system. The energy audit tool includes a data collector module configured for temporary connection to an existing turbine controller of the existing wind turbine power system. The data collector module is configured to collect operating data of the existing wind turbine power system. The energy audit tool also includes a model simulator module configured for analyzing the collected operating data, generating a model of the existing wind turbine power system based on the collected operating data, and determining an energy loss of the existing wind turbine power system from the model of the existing wind turbine power system.

In one embodiment, the model simulator module may be further configured to generate a report of the energy loss of the existing wind turbine power system. In such embodiments, the report may include a percentage of how much a plurality of operating states contributed to the energy loss.

In particular embodiments, the operating data may include voltage, current, rotor speed, pitch angle, active power, reactive power, yaw angle, wind direction, wind speed, nacelle direction, temperature, air pressure, faults, mechanical strains, and/or combinations thereof. More specifically, in certain embodiments, the operating data may include time-series operating data. As used herein, time-series operating data generally refers to a sequence of data points collected at set time intervals over a continuous period of time.

In another embodiment, the data collector module may be further configured to receive an auxiliary power level of an auxiliary power bus of the existing wind turbine power system and send the auxiliary power level to the model simulator module. In such embodiments, the model simulator module is configured to generate the model of the existing wind turbine power system based on the collected operating data and the auxiliary power level. In further embodiments, the data collector module may be further configured to send the operating data of the existing wind turbine power system and the auxiliary power level to a cloud server.

In additional embodiments, the data collector module may be communicatively coupled to one or more sensors configured for monitoring the operating data and the auxiliary power level. For example, in one embodiment, the sensor(s) may be communicatively coupled to the data collector module via at least one input/output (I/O). More specifically, in certain embodiments, the sensor(s) may include strain gauges, accelerometers, temperature sensors, Micro Inertial Measurement Units (MIMUs), pressure sensors, humidity sensors, speed sensors, airflow sensors, angle of attack sensors, vibration sensors, Light Detecting and Ranging (LIDAR) sensors, optical sensors, anemometers, wind vanes, Sonic Detection and Ranging (SODAR) sensors, infra lasers, radiometers, pitot tubes, rawinsondes, or combinations thereof.

In another aspect, the present disclosure is directed to a method for evaluating efficiency of an existing wind turbine power system. The method includes temporarily installing a data collector module of an energy audit tool into an existing turbine controller of the existing wind turbine power system. During operation of the existing wind turbine power system, the method includes collecting, via the data collector module, operating data of the existing wind turbine power system. The method also includes analyzing, via a model simulator module of the energy audit tool, the collected operating data. Further, the method includes generating, via the model simulator module, a model of the existing wind turbine power system based on the collected operating data. Moreover, the method includes determining, via the model simulator module, an energy loss of the existing wind turbine power system from the model of the existing wind turbine power system.

In one embodiment, the method also includes removing the energy audit tool from the existing wind turbine power system. It should be understood that the method may be further configured with the additional features and/or to perform the additional method steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
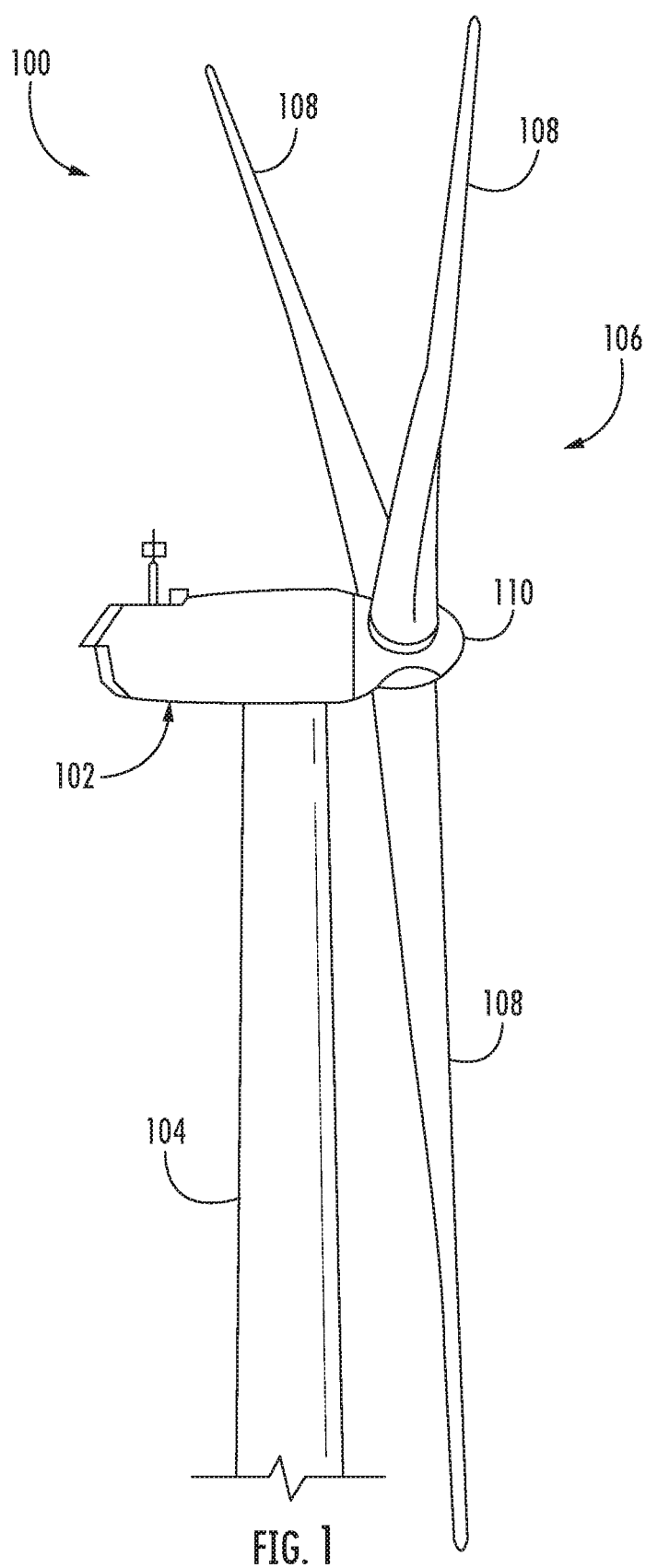
FIG. 1 illustrates a perspective view of a portion of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to an energy audit tool for a wind turbine power system that monitors certain inputs/outputs (I/O) of the power system to ascertain energy loss, thereby improving revenue. For example, in one embodiment, the energy audit tool is intended to be temporarily installed as a tool on new or existing wind turbines to monitor operation thereof for a predetermined time period to ascertain revenue loss due to energy loss. More specifically, the energy audit tool may include a data collection module that is connected via a LAN connection to the turbine controller and imports certain tags (such as voltage, speed, torque, pitch angle, etc.), e.g. over Modbus TCP or OPC UA. In addition, various sensors may be included as separate I/O. The collected data can then be pushed to the cloud. The energy audit tool can then analyze the data and generate a model to fit the collected data and search for entitlement.

Referring now to the drawings, FIG. 1 illustrates a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
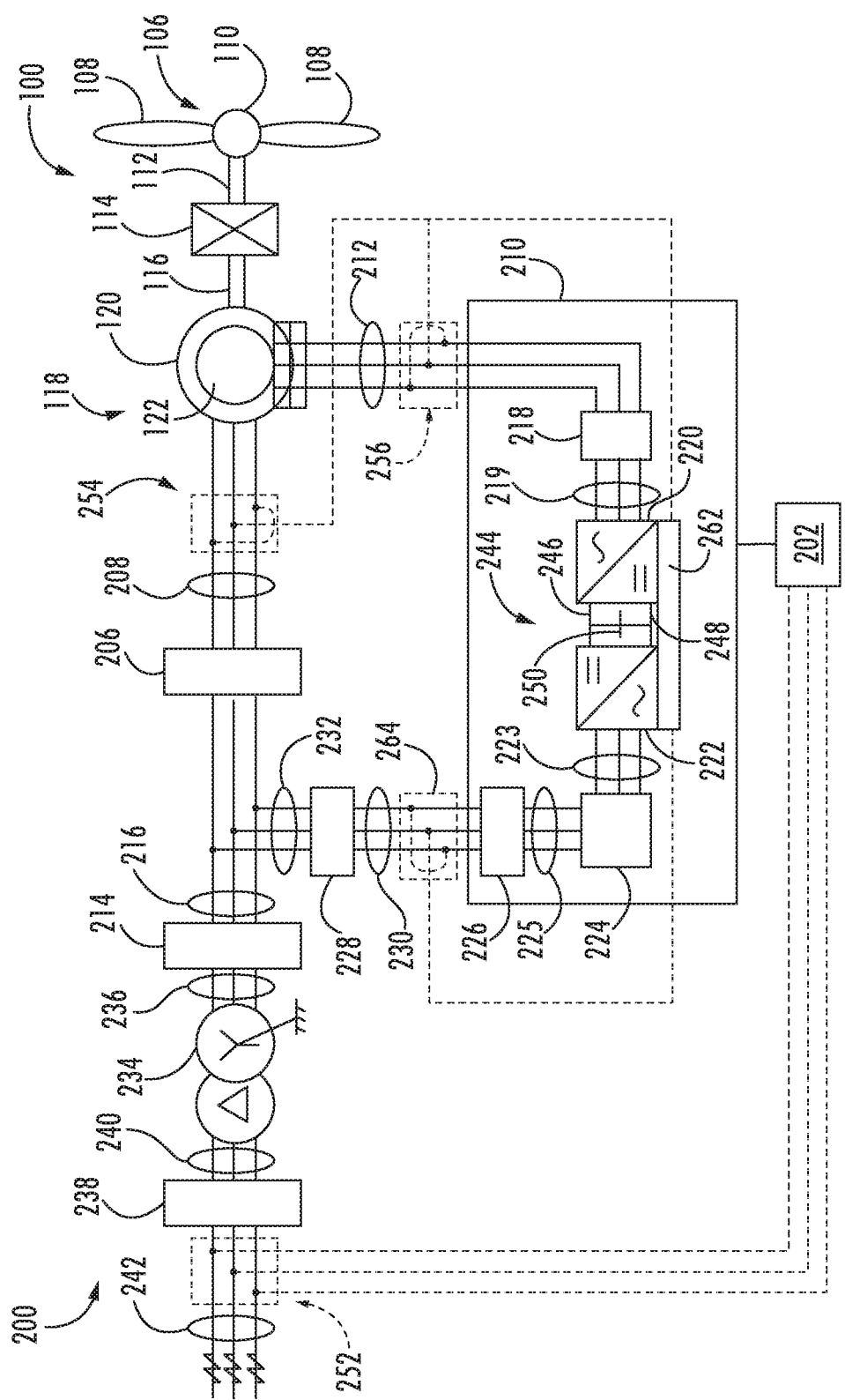
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a breaker-side bus 240, a grid circuit breaker 238, and a grid bus 242.

The generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

During operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with a converter controller 262 and/or a turbine controller 202 configured to control the operation of the rotor-side power converter 220 and the line-side power converter 222. For example, during operation, the controller 202 may be configured to receive one or more voltage and/or electric current measurement signals from a first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 264 (all shown in FIG. 2), and/or any other suitable sensors. Further, the voltage and electric current sensors 252, 254, 256, 264 may be configured to measure, directly or indirectly, a power output of the wind turbine 100.

In addition, the converter controller 262 is configured to receive one or more voltage and electric current measurement signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 264. In addition, the converter controller 262 may be configured with any of the features described herein in regards to the turbine controller 202. Further, the converter controller 262 may be separate from or integral with the turbine controller 202.

Figure 3:
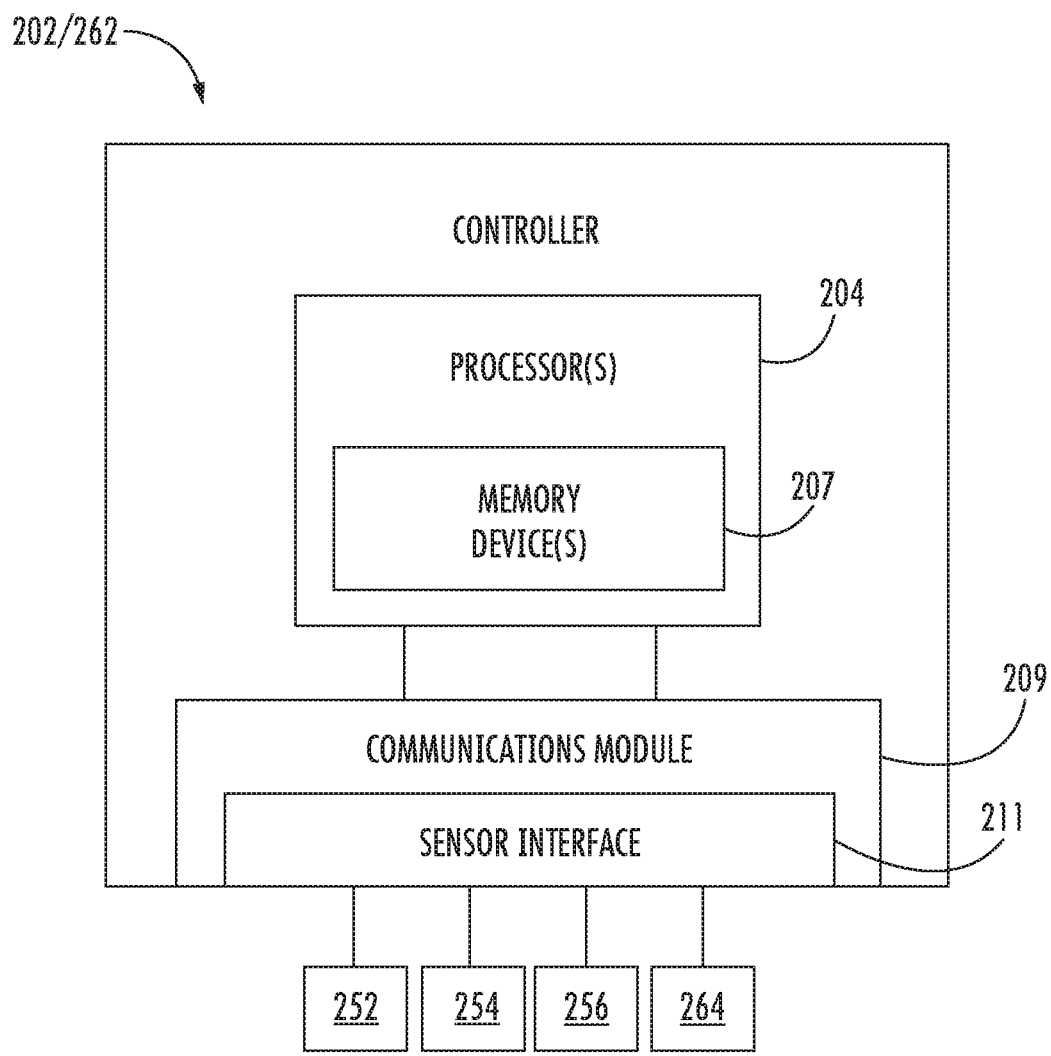
FIG. 3 illustrates a block diagram of one embodiment of suitable components that may be included in a controller according to the present disclosure.

Thus, the wind turbine controller 202, as well as the converter controller 262, is configured to control various components of the wind turbine 100. Accordingly, as shown particularly in FIG. 3, the controller(s) 202, 262 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 264) may be communicatively coupled to the communications module 209 using any suitable means. For example, as shown in FIG. 3, the sensors 252, 254, 256, 264 may be coupled to the sensor interface 211 via a wired connection. However, in other embodiments, the sensors 252, 254, 256, 264 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

It should also be understood that any number or type of sensors may be employed within the wind turbine 100 and at any location. For example, the sensors as described herein may be temperature sensors, Micro Inertial Measurement Units (MIMUs), strain gauges, accelerometers, pressure sensors, humidity sensors, speed sensors, strain gauges, accelerometers, airflow sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors.

Figure 4:
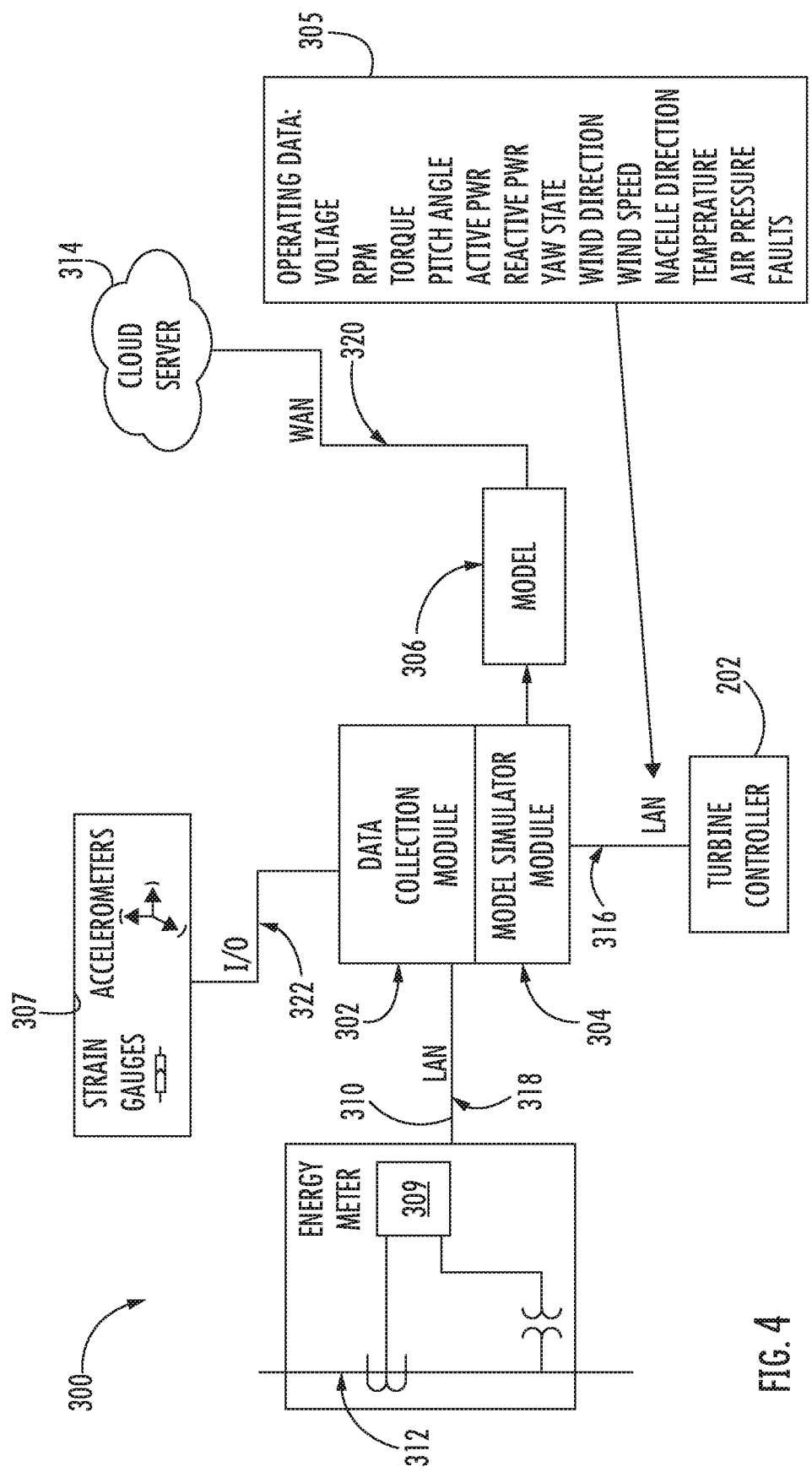
FIG. 4 illustrates a simplified, schematic diagram of one embodiment of an energy audit tool for evaluating energy loss of a wind turbine power system according to the present disclosure.

Referring now to FIG. 4, a simplified, schematic diagram of one embodiment of an energy audit tool for a wind turbine power system, such as the wind turbine power system 200 of FIG. 2, is illustrated. As shown, the energy audit tool 300 includes a data collector module 302 configured for temporary connection to the existing turbine controller 202 of the existing wind turbine power system 200, e.g. via a local area network (LAN) 316. Further, as shown, the data collector module 302 is configured to collect operating data 305 of the existing wind turbine power system 200 during operation thereof.

For example, in particular embodiments, the operating data 305 may include voltage, current, rotor speed, pitch angle, active power, reactive power, yaw angle, wind direction, wind speed, nacelle direction, temperature, air pressure, faults, mechanical strains, and/or combinations thereof. More specifically, in certain embodiments, the operating data may include time-series operating data. As used herein, time-series operating data generally refers to a sequence of data points collected at set time intervals over a continuous period of time.

In addition, as shown, the energy audit tool 300 also includes a model simulator module 304 configured for analyzing the collected operating data. For example, the model simulator module 304 may be configured to process the collected data, e.g. using data storage, data conversion, data cleaning and/or error removal, data validation, data separation and/or sorting, data summarization and aggregation, and/or data presentation or reporting.

In further embodiments, the model simulator module 304 is also configured to generate a model 306 of the existing wind turbine power system 200 based on the collected and/or analyzed operating data. From the model 306, the model simulator module 304 is configured to determine an energy loss of the existing wind turbine power system 200.

Figure 5:
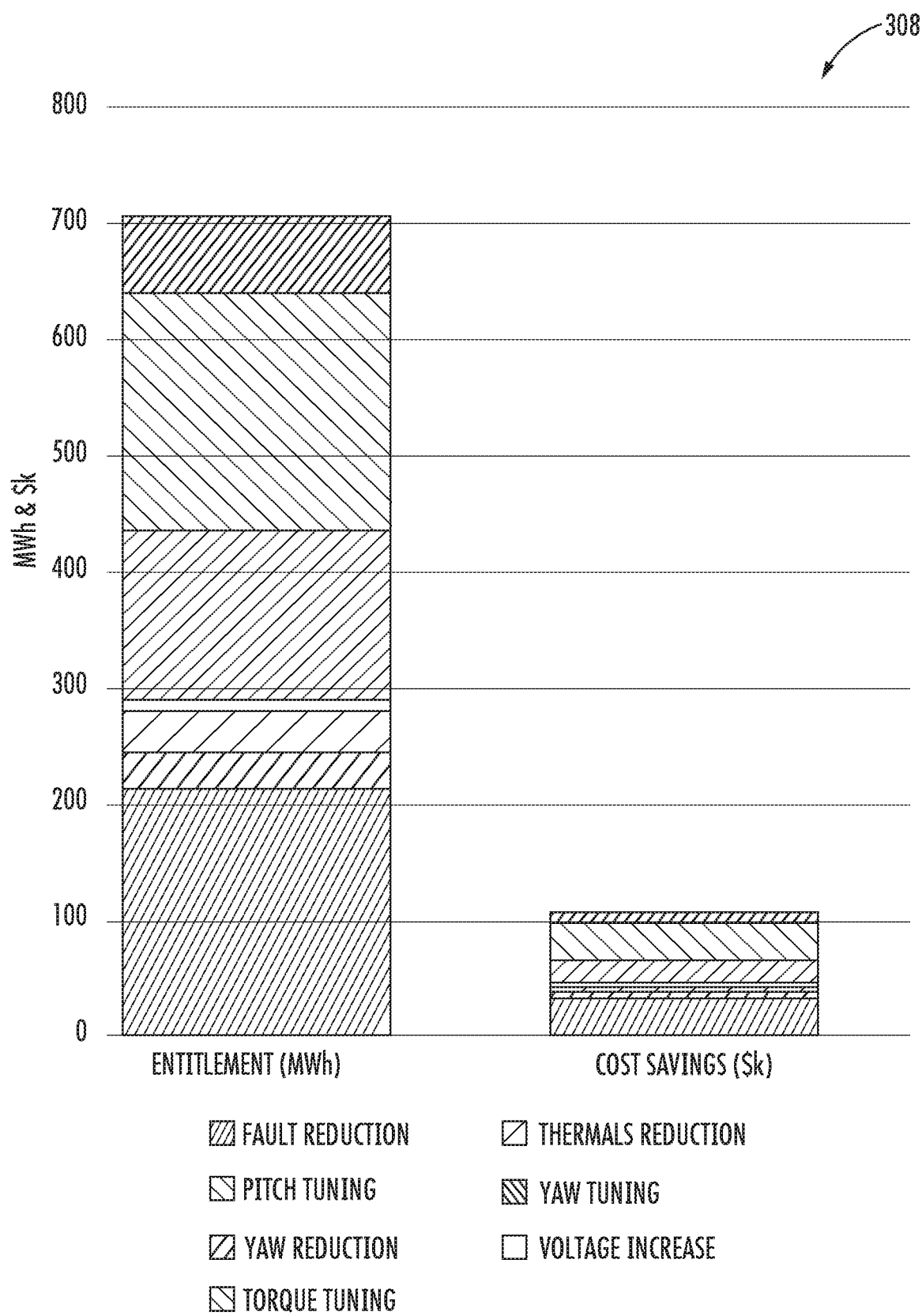
FIG. 5 illustrates a graph of one embodiment of a report of the energy loss of a wind turbine power system generated by a model simulator module of the energy audit tool according to the present disclosure.

Referring to FIGS. 4 and 5, the model simulator module 304 may also be further configured to generate a report 308 of the energy loss of the existing wind turbine power system 200. More specifically, as shown, the report 308 may include an amount or percentage of how much a plurality of operating states contributed to the energy loss. As such, a site operator can easily ascertain which operating parameters of the wind turbine power system 200 can be adjusted so as to reduce the energy lost. For example, as shown in the illustrated report 308, torque tuning and fault reduction will provide the operator with the most energy improvement. Still other operating states that can be assessed may include, for example, pitch tuning, yaw reduction, yaw tuning, thermals reduction, and/or voltage increases.

In another embodiment, the data collector module 302 may be further configured to receive an auxiliary power level 310 of an auxiliary power bus 312 of the existing wind turbine power system 200. In typical wind turbine power systems, the auxiliary power is often not a tag within the turbine controller 202, therefore, as shown, the energy audit tool 300 may be equipped with an additional input/output (I/O) 318 (illustrated as a local area network (LAN)) to connect to the auxiliary power bus 312. In such embodiments, the data collector module 302 is configured to receive and send the auxiliary power level 310 via the I/O 318 to the model simulator module 304. Thus, the model simulator module 304 is configured to generate the model 306 of the existing wind turbine power system 200 based on the collected operating data as well as the auxiliary power level 310.

Still referring to FIG. 4, the data collector module 302 may be further configured to send the operating data of the existing wind turbine power system 200 and the auxiliary power level 310 to a cloud or virtual server 314, e.g. via a wide area network (WAN) 320.

Figure 6:
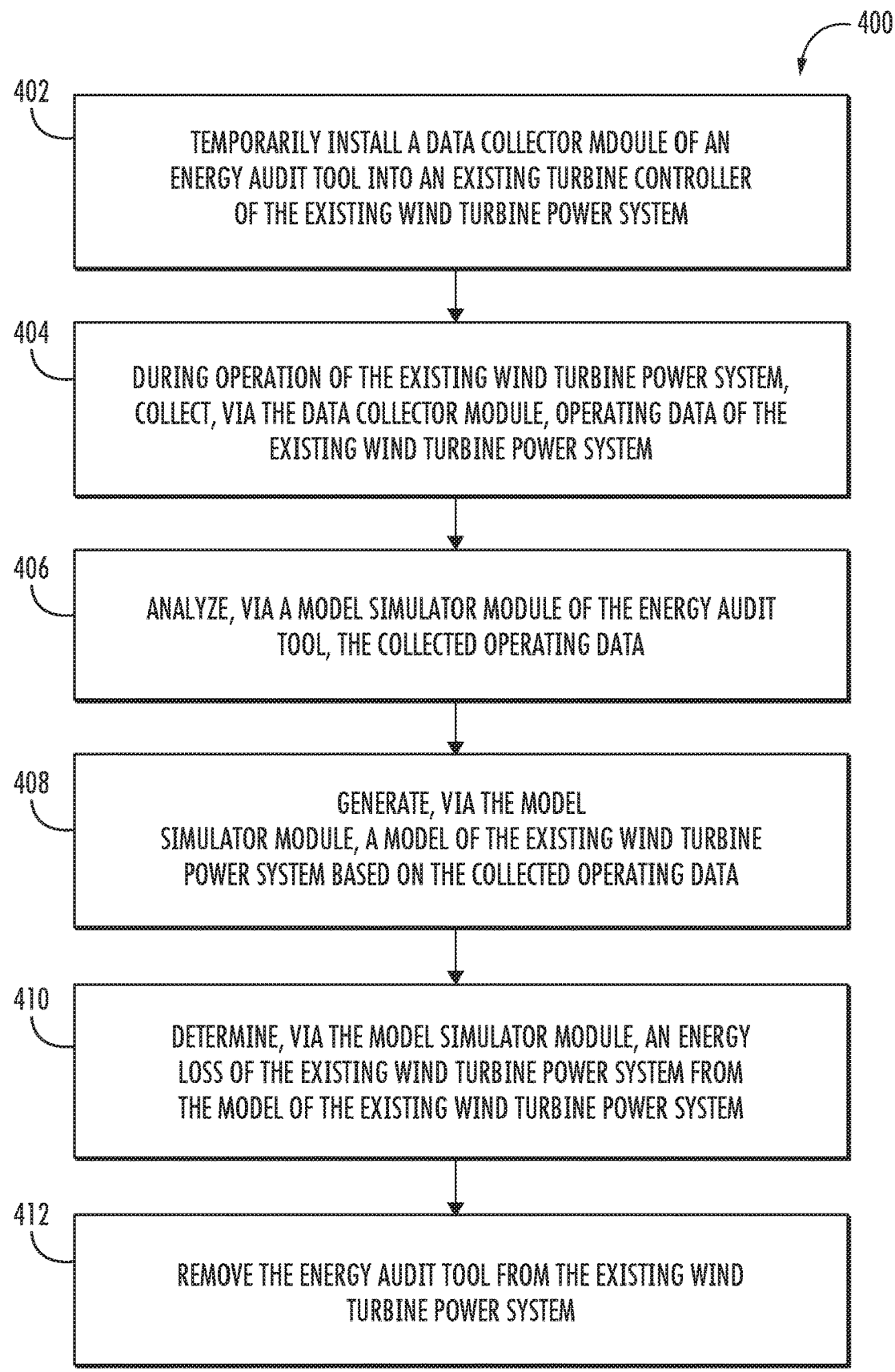
FIG. 6 illustrates a flow diagram of one embodiment of a method for evaluating efficiency of an existing wind turbine power system according to the present disclosure.

In additional embodiments, the data collector module 302 may be communicatively coupled to one or more sensors 307, 309 configured for monitoring the operating data 305 and/or the auxiliary power level 310. For example, in one embodiment, the sensor(s) 307, 309 may be communicatively coupled to the data collector module 302 via the LAN 316 and/or via a separate I/O 322. More specifically, in certain embodiments, the sensor(s) 307, 309 may include strain gauges, accelerometers, temperature sensors, Micro Inertial Measurement Units (MIMUs), pressure sensors, humidity sensors, speed sensors, airflow sensors, angle of attack sensors, vibration sensors, Light Detecting and Ranging (LIDAR) sensors, optical sensors, anemometers, wind vanes, Sonic Detection and Ranging (SODAR) sensors, infra lasers, radiometers, pitot tubes, rawinsondes, or combinations thereof. In addition, as shown, certain types of sensors Referring now to FIG. 6, a flow diagram of one embodiment of one embodiment of a method 400 for evaluating efficiency of an existing wind turbine power system is illustrated. In general, the method 400 will be described herein with reference to the wind turbine power system 200 shown in FIGS. 1-3 and the energy audit tool 300 shown in FIG. 4. However, it should be appreciated that the disclosed method 400 may be implemented with wind turbines having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (402), the method 400 may include temporarily installing a data collector module 322 of an energy audit tool 300 into an existing turbine controller 202 of the existing wind turbine power system 200. During operation of the existing wind turbine power system 200, as shown at (404), the method 400 includes collecting, via the data collector module 302, operating data of the existing wind turbine power system 200. As shown at (406), the method 400 may include analyzing, via a model simulator module 304 of the energy audit tool 300, the collected operating data. As shown at (408), the method 400 may include generating, via the model simulator module 304, a model of the existing wind turbine power system 200 based on the collected operating data. As shown at (410), the method 400 may include determining, via the model simulator module 304, an energy loss of the existing wind turbine power system 200 from the model of the existing wind turbine power system 200. In addition, as shown at (412), the method 400 may also include removing the energy audit tool 300 from the existing wind turbine power system 200 after determining the energy loss.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An energy audit tool for assessing energy loss during operation of an existing wind turbine power system, the energy audit tool comprising:
   a data collection controller module temporarily communicatively coupled to each of an existing turbine controller of the existing wind turbine power system and an auxiliary power bus comprising an energy sensor coupled thereto over a local area network via a first input/output connection and a second input/output connection, respectively, the data collection controller module configured to collect operating data of the existing wind turbine power system from the existing turbine controller during operation of the existing wind turbine power system and an auxiliary power level from the energy sensor of the auxiliary power bus via the first input/output connection and the second input/output connection, respectively; and,
   a model simulator controller module for analyzing the collected operating data, generating a model of the existing wind turbine power system based on the collected operating data and the auxiliary power level, and determining the energy loss of the existing wind turbine power system from the model of the existing wind turbine power system.

2. The energy audit tool of claim 1, wherein the model simulator controller module is further configured to generate a report of the energy loss of the existing wind turbine power system.

3. The energy audit tool of claim 2, wherein the report comprises a percentage of how much a plurality of operating states contributed to the energy loss.

4. The energy audit tool of claim 1, wherein the operating data comprises at least one of voltage, current, rotor speed, pitch angle, active power, reactive power, yaw angle, wind direction, wind speed, nacelle direction, temperature, air pressure, faults, mechanical strains, or combinations thereof.

5. The energy audit tool of claim 1, wherein the data collection controller module is further configured to send the operating data of the existing wind turbine power system and the auxiliary power level and/or the model to a cloud server.

6. The energy audit tool of claim 1, wherein the data collection controller module is communicatively coupled to one or more sensors configured for monitoring the operating data.

7. The energy audit tool of claim 6, wherein the one or more sensors are communicatively coupled to the data collection controller module via an additional, input/output connection.

8. The energy audit tool of claim 6, wherein the one or more sensors comprise at least one of strain gauges, accelerometers, temperature sensors, Micro Inertial Measurement Units (MIMUs), pressure sensors, humidity sensors, speed sensors, airflow sensors, angle of attack sensors, vibration sensors, Light Detecting and Ranging (LIDAR) sensors, optical sensors, anemometers, wind vanes, Sonic Detection and Ranging (SODAR) sensors, infra lasers, radiometers, pitot tubes, or rawinsondes.

9. The energy audit tool of claim 1, wherein the operating data comprises time-series operating data, the time-series operating data comprises a sequence of data points collected at set time intervals over a continuous period of time.

10. The energy audit tool of claim 1, wherein the energy loss comprises hidden or unknown energy losses, wherein the hidden or unknown energy losses comprise one or more of incorrect transformer tap location, non-optimized torque table, non-optimized pitch table, excessive yawing, excessive cooling, excessive heating, one or more faults, or incorrectly-mounted sensors.

11. A method for evaluating efficiency of an existing wind turbine power system, the method comprising:
   temporarily communicatively coupling a data collection controller module of an energy audit tool into each of an existing turbine controller of the existing wind turbine power system and an auxiliary power bus comprising an energy sensor coupled thereto over a local area network via a first input/output connection and an additional second input/output connection, respectively;
   during operation of the existing wind turbine power system, collecting, via the data collection controller module, operating data of the existing wind turbine power system from the existing turbine controller during operation of the existing wind turbine power system and an auxiliary power level from the energy sensor of the auxiliary power bus via the first input/output connection and the second input/output connection, respectively;
   analyzing, via a model simulator controller module of the energy audit tool, the collected operating data and the auxiliary power level;
   generating, via the model simulator controller module, a model of the existing wind turbine power system based on the collected operating data and the auxiliary power level; and,
   determining, via the model simulator controller module, an energy loss of the existing wind turbine power system from the model of the existing wind turbine power system.

12. The method of claim 11, further comprising removing the energy audit tool from the existing wind turbine power system.

13. The method of claim 11, further comprising generating, via the model simulator controller module, a report of the energy loss of the existing wind turbine power system.

14. The method of claim 13, wherein the report comprises a percentage of how much a plurality of operating states contributed to the energy loss.

15. The method of claim 11, wherein the operating data comprises at least one of voltage, current, rotor speed, pitch angle, active power, reactive power, yaw angle, wind direction, wind speed, nacelle direction, temperature, air pressure, faults, mechanical strains, or combinations thereof.

16. The method of claim 11, further comprising:
   receiving, via the data collection controller module, an auxiliary power level of an auxiliary power bus of the existing wind turbine power system;
   sending, via the data collection controller module, the auxiliary power level to the model simulator controller module; and,
   generating, via the model simulator controller module, the model of the existing wind turbine power system based on the collected operating data and the auxiliary power level.

17. The method of claim 16, wherein the data collection controller module is further configured to send the operating data of the existing wind turbine power system and the auxiliary power level to a cloud server.

18. The method of claim 16, further comprising monitoring, via one or more sensors communicatively coupled to the data collection controller module via at least one input/output (I/O), the operating data.

19. The method of claim 18, wherein the one or more sensors comprise at least one of strain gauges, accelerometers, temperature sensors, Micro Inertial Measurement Units (MIMUs), pressure sensors, humidity sensors, speed sensors, airflow sensors, angle of attack sensors, vibration sensors, Light Detecting and Ranging (LIDAR) sensors, optical sensors, anemometers, wind vanes, Sonic Detection and Ranging (SODAR) sensors, infra lasers, radiometers, pitot tubes, or rawinsondes.

20. The method of claim 11, wherein the operating data comprises time-series operating data, the time-series operating data comprises a sequence of data points collected at set time intervals over a continuous period of time.

\* \* \* \* \*